United States Patent [19]

Shragal

[11] 4,074,071
[45] Feb. 14, 1978

[54] AUTOMATIC TELEPHONE ANSWERING DEVICE WITH PAIRED TRANSDUCERS

[75] Inventor: Robert Shragal, Bellwood, Ill.

[73] Assignee: Wells-Gardner Electronics Corporation, Chicago, Ill.

[21] Appl. No.: 672,864

[22] Filed: Apr. 2, 1976

[51] Int. Cl.² ...................... H04M 1/64; G11B 21/08
[52] U.S. Cl. ................................... 179/6 R; 360/61; 360/78
[58] Field of Search .................... 179/6 R, 6 AC, 6 C, 179/6 E, 100.1 C, 100.1 PS; 360/12, 61, 63, 78

[56] References Cited

U.S. PATENT DOCUMENTS

| | | | |
|---|---|---|---|
| 2,937,237 | 5/1960 | Zanardo | 179/6 AC |
| 2,944,116 | 7/1960 | Vershoven | 179/100.1 C |
| 3,501,592 | 3/1970 | Waldman | 179/6R |
| 3,590,159 | 6/1971 | Wolf | 179/6 R |
| 3,592,968 | 7/1971 | Ogawa | 179/6 R |
| 3,728,487 | 4/1973 | Hata | 179/6 R |
| 3,909,538 | 9/1975 | Jacobson | 179/6 R |
| 4,032,981 | 6/1977 | Arguelles | 360/78 |

FOREIGN PATENT DOCUMENTS 901,173  7/1962  United Kingdom ............... 179/6 R

*Primary Examiner*—Raymond F. Cardillo, Jr.

*Attorney, Agent, or Firm*—Mason, Kolehmainen, Rathburn & Wyss

[57] ABSTRACT

A telephone answering system utilizes a single stereophonic eight-track cartridge type tape player/recorder for playing a telephone answering message and for recording messages received from up to four callers. The eight-track player/recorder is modified so that one of the two stereophonic channels may be operated in a playback mode to play the telephone answering message recorded on one track of the tape, while the other channel is simultaneously operated in a recording mode for recording an incoming message on a companion track of the tape. The cartridge contains a short length of recording tape having a playing time sufficient to contain the answering message and one incoming message per pass. A conductive strip on the tape causes the player/recorder to step to another pair of tracks after each incoming message has been recorded to condition the machine to play another answering message and to record another incoming message upon receipt of a subsequent telephone call. Circuitry for disabling the telephone answering function prevents the telephone from being automatically answered after four incoming messages have been recorded. This prevents a fifth incoming message from being recorded over the first incoming message. Direct current bias and erase signals are used to prevent interference between the simultaneously operating record and playback heads.

21 Claims, 16 Drawing Figures

AUTOMATIC TELEPHONE ANSWERING DEVICE WITH PAIRED TRANSDUCERS

BACKGROUND OF THE INVENTION

This invention relates generally to telephone answering devices, and more particularly, to telephone answering devices utilizing a cartridge type player/recorder for recording a telephone answering message on one track of a tape cartridge and the incoming message on another track of the same tape cartridge.

Several types of telephone answering devices are known. Known systems generally employ a separate tape deck containing a short tape loop containing the answering message, and a second tape deck containing a much longer length of tape for recording incoming telephone messages.

While such devices can store a large number of received telephone messages, and are useful for business or commercial use, the use of two separate tape decks raises the cost of such units enough to bring them out of the price range of the consumer market. Furthermore, such devices generally have the disadvantage that after enough calls to completely fill the incoming message tape have been received, the answering unit continues to answer the telephone and to play the answering message, thereby giving the caller the impression that his message has been recorded although it has not.

SUMMARY OF THE INVENTION

Accordingly, it is an object of the present invention to provide an improved telephone answering device.

It is another object of the present invention to provide a telephone answering device that overcomes most of the disadvantages of the prior art telephone devices.

It is another object of the present invention to provide a low cost telephone answering device having a limited message capacity suitable for the consumer market.

It is yet another object of the present invention to provide a telephone answering device that utilizes a single multitrack tape deck for recording an answering message on one tape track and an incoming message on another tape track.

It is yet another object of the present invention to provide an automatic telephone answering device that automatically turns itself off after its incoming call capacity has been reached.

In accordance with a preferred embodiment of the invention, an eight-track stereophonic cartridge tape deck (player/recorder) is used as the basic recording and playback device for the telephone answering device. The cartridge tape deck is modified to permit one of the stereophonic channels to be operated in the playback mode while the other one of the stereophonic channels is operated in a recording mode. A short tape loop having a playing time of approximately 1 minute and a conductive indexing mark is used as the record medium.

An answering message is recorded on four separate tape tracks, each track corresponding to one of the stereophonic channels of one of the four stereophonic programs. Upon receipt of a ringing signal, the telephone is automatically answered and the answering message recorded on one of the tracks is played back into the telephone line by one of the stereophonic channels of the player/recorder. The recorder continues to run and the received message is recorded by the other one of the stereophonic channels onto a second track associated with the track just played back. The deck continues to operate until the conductive strip is sensed by a head indexing device at which point the operation of the tape transporting mechanism is suspended and the recording/playback head assembly is indexed to the next pair of tracks. A subsequent ringing signal reinitiates the operation of the tape deck, and causes the answering message recorded on one of the next pair of tracks to be played back into the telephone line and the incoming message to be recorded onto the other track of the pair.

The above described operation is repeated a total of four times to permit four different incoming messages to be recorded. After four messages have been recorded, the operation of the answering device is automatically discontinued to prevent further telephone calls from being answered to thereby avoid giving the caller the impression that his message had been recorded when it had not.

The other objects and advantages of the present invention will become readily apparent from the following drawings wherein:

Figure 1:
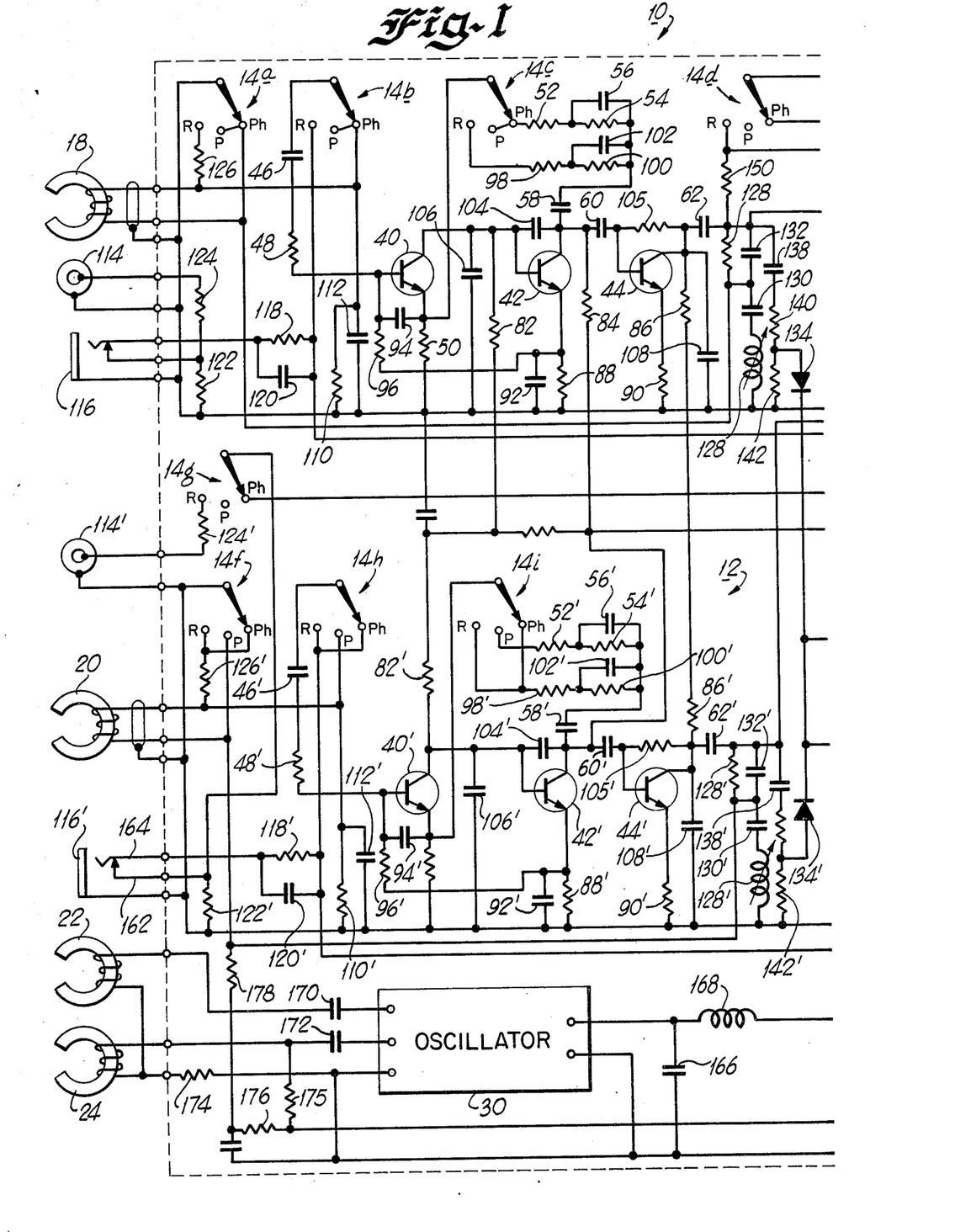
FIGS. 1 and 2 form a detailed schematic diagram of the electrical circuitry of the answering device according to the invention.
Figure 2:
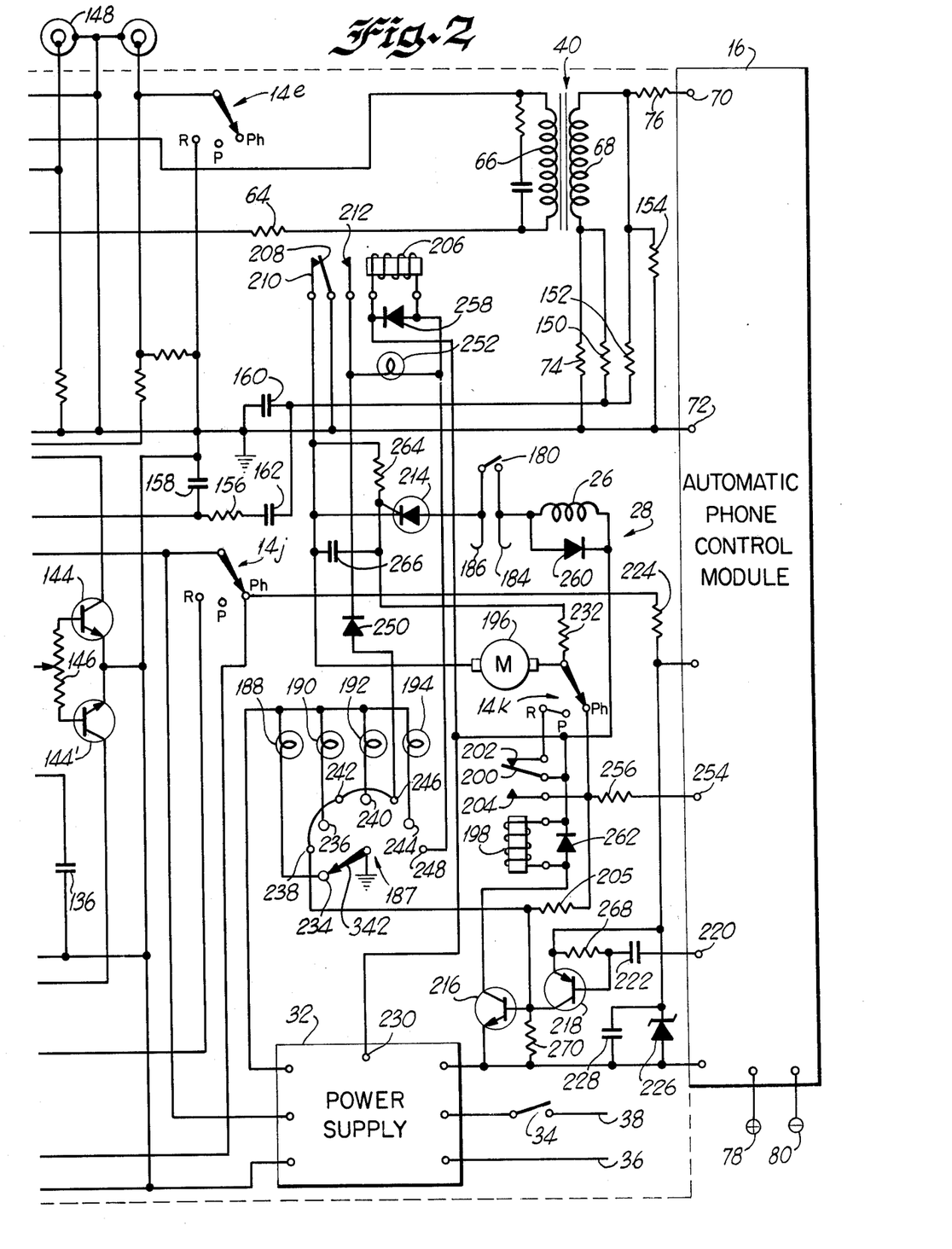

Referring now to the drawings, with particular attention to FIGS. 1 and 2, the telephone answering device utilizes an eight-track cartridge tape deck as the basic recording and playback unit. A typical unit suitable for use with the answering device according to the invention is an Alps-Motorola Model ML41C110 tape deck, but other suitable cartridge player/recorders may be used. In the present embodiment, the player/recorder includes a two-channel record/play amplifier comprising amplifiers designated generally by the numerals 10 and 12. The amplifiers 10 and 12 are switched between the record and playback modes by a three-position eleven-pole function selector switch 14 consisting of poles 14a–14k. The three-position switch 14 selectively places the telephone answering device into one of three modes of operation; a playback mode wherein both the amplifiers 10 and 12 are conditioned to play back signals recorded on a magnetic tape 322 (FIGS. 14 and 15), a recording mode wherein both of the amplifiers 10 and 12 are conditioned to record signals on the magnetic tape 322, and a phone mode wherein the amplifier 10 is placed in a playback mode and the amplifier 12 is placed in a record mode. The output of the amplifier 10 and the input to the amplifier 12 is coupled to the telephone line being monitored.

An automatic phone control module 16 is interposed between the telephone line and the answering device and serves to couple audio signals between the answering device and the telephone line, to detect the presence of a ringing signal on the telephone line and provide a signal to the answering device indicating the presence of an incoming call, and to "answer" the phone by providing a direct current conductive path across the phone lines to simulate an off hook condition. Such a device is available from the telephone company.

A pair of record/playback transducers 18 and 20, and a pair of erase transducers 22 and 24 are mounted in a single head assembly 310 which is stepped by a program indexing mechanism 312 (FIGS. 4–8) that is controlled by a program solenoid 26 located in a stepping control logic circuit generally designated as 28. An oscillator unit 30, operating at approximately 83 kilohertz applies bias oscillations to the record/playback transducers 18 and 20 and to the erase transducers 22 and 24 when the device is operated in the recording mode. A power supply 32 supplies power to the amplifiers 10 and 12, to the phone control module 16, to the stepping logic circuitry 28 and to the oscillator unit 30. A microswitch 34 completes the circuit between the power supply 32 and a pair of power leads 36 and 38 to energize the circuitry when a cartridge is inserted into the device. A transformer coupling unit 40 is utilized to couple audio signals between the output of the automatic phone control module 16 and the amplifiers 10 and 12.

Referring now to the drawings in greater detail, the amplifiers 10 and 12 are conventional record/playback amplifiers of the type used in a conventional stereophonic eight-track cartridge type tape player/recorder such as the unit manufactured by Alps-Motorola, Inc.; however, the operation of the amplifiers 10 and 12 will be briefly described to afford a better understanding of the operation of the telephone answering device according to the invention.

The amplifier 10 (FIG. 1) is a three-transistor amplifier including three transistors 40, 42 and 44 connected in cascade. With the selector switch 14 placed in the phone position, as shown on the schematic, the base of the transistor 40 is coupled to the transducer 18 via the switch 14b, a capacitor 46 and a resistor 48. The signals from the transducer 18 are amplified by the transistor 40 and applied to the base of the transistor 42. The output of the transistor 42 is coupled to the junction of the emitter of the transistor 40 and a resistor 50 via an equalizing network comprising a pair of resistors 52 and 54 and a capacitor 56, a coupling capacitor 58 and the pole 14c of the switch 14. The equalizing network serves to modify the frequency spectrum of the signals received from the transducer 18 to provide a signal having a relatively flat frequency spectrum to the base of the transistor 44 via a coupling capacitor 60. The relatively flat frequency spectrum signal is amplified by the transistor 44 and applied to the transformer coupling unit 40 via a coupling capacitor 62 and a resistor 64. The circuit through the primary winding 66 of the transformer coupling unit 40 is completed through the pole 14d of the switch 14 to ground. The signal flowing through the primary winding 66 is inductively coupled to a secondary winding 68 of the transformer coupling unit 40 and applied to a pair of terminals 70 and 72 of the automatic phone control module 16 via a pair of coupling resistors 74 and 76. The terminals 70 and 72 are electrically coupled within the module 16 to a pair of terminals 78 and 80, which may be connected directly to the telephone line, to permit audio signals to be transferred between the telephone line and the answering device according to the invention.

The other components comprising the amplifier 10 not described above are conventional components used in amplifier design. For example, the resistors 82, 84 and 86 serve as collector load resistors for the transistors 40, 42 and 44. Resistors 88 and 90 are emitter resistors for the transistors 42 and 44, and a capacitor 92 serves as an emitter bypass capacitor to bypass the emitter of the transistor 42. A capacitor 94 bypasses high frequency signals around the base-emitter junction of the transistor 40, and a resistor 96 provides bias current and DC feedback to the base of the transistor 40. A second equalization network including resistors 98 and 100 and a capacitor 102 provides equalization for the amplifier 10 when the device is in the record mode. A capacitor 104 reduces the gain of the transistor 42 at high frequencies and a resistor 105 provides negative feedback around the transistor 44. Capacitors 106 and 108 bypass high frequency signals to ground to prevent regeneration, and also serve to bypass the high frequency bias signal from the oscillator unit 30 to ground. A resistor 110 and a capacitor 112 serve as a load for the transducer 18, and additional inputs may be applied to the amplifier 10 by means of an auxiliary input 114 and a microphone input 116 which are coupled to the base of the transistor 40 via the resistor 48, the capacitor 46, the pole 14b, a coupling network including a resistor 118 and a capacitor 120 and a pair of resistors 122 and 124.

In the record mode, one lead of the transducer 18 is connected to ground through a resistor 126 and the switch pole 14a, and the output of the transistor 44 is coupled to the other lead of the transducer 18 via the coupling capacitor 62 and a resistor 128. An 83 kilohertz trap comprising an adjustable inductor 128 and capacitors 130 and 132 attenuates any bias frequency signals present at the output of the transistor 44. A diode detector 134 that has its output filtered by a large value capacitor 136 receives signal from the output of the amplifier 44 via a capacitor 138 and resistors 140 and 142 and provides a bias voltage to a transistor 144 via a potentiometer 146. The collector resistance of the transistor 144 is controlled by the bias voltage from the diode detector 134, and the variable collector resistance acts in combination with the resistor 118 to provide a variable attenuator for the input signal to prevent the overloading of the amplifier 10 in the record mode. An auxiliary output coupled to the transistor 44 via a resistor 150 and the capacitor 62 is also provided.

The structure and operation of the amplifier 12 is similar to that of the amplifier 10, and analogous components are denoted by like numbers with the numbers designating the components in the amplifier 12 being primed numbers. With the switch 14 in the phone position as shown in the figures, the amplifier 12 is conditioned to record signals received from the telephone line, while the amplifier 10 is conditioned to apply recorded signals received from the transducer 18 to the telephone line. Signals from the telephone line are applied to the base of the transistor 40' via the automatic phone control module 16, the resistor 76, a hybrid including the secondary winding 68 and resistors 74, 150, 152 and 154, the network comprising a resistor 156 and capacitors 158, 160 and 162, the pole 14g, a pair of normally closed contacts 162 and 164 in the microphone input 116', the resistor 118' and capacitor 120', the pole 14h of the switch 14, the capacitor 46' and the resistor 48'. The signals thus applied to the base of the transistor 40' are amplified by the three-stage amplifier including the transistors 40', 42' and 44' and applied to the transducer 20 via the network connected to the collector of the transistor 44' and the pole 14f. The prerecorded answering message played back by the transducer 18 is also recorded by the transducer 20, but at a reduced level as a result of the hybrid action of the resistors 74, 150, 152 and 154.

During operation in the normal record mode, the oscillator 30 is provided with power from the power supply 32 via the pole 14j and a filter network including a capacitor 166 and an inductor 168. This causes the oscillator unit 30 to provide oscillations having a frequency of approximately 83 kilohertz to the erase transducers 22 and 24 via a pair of capacitors 170 and 172 and a resistor 174. However, when the device is operated in the phone mode, the 83 kilohertz oscillations can interfere with the playback function and could also erase the recorded answering message, particularly when, as in the present embodiment, all of the recording, playback and erase transducers are physically mounted in the single head assembly 310. Accordingly, the power applied to the oscillator unit 30 is disconnected by the pole 14j when the device is placed in the phone position. Instead direct current bias and erase is provided by the direct current voltage that is normally applied to the oscillator unit 30 when the unit is in the record position. The direct current potential is applied to one of the erase transducers 24 via a resistor 175 to provide an erase function and to the transducer 20 via resistors 176 and 178 to provide bias for the channel that is in the recording mode.

The stepping logic 28 controls the position of the head assembly 310 (FIGS. 4, 7, 9, 10, 14) carrying the transducers 18, 20, 22 and 24, and is controlled by the program solenoid 26. Each time the program solenoid 26 is energized, either by closing a program switch 180 or in response to the conductive strip 328 (FIG. 15) on the tape being brought into contact with a pair of contacts 184 and 186, the head assembly 310 containing the transducers 18, 20, 22 and 24 is incremented one step to bring the transducers into alignment with the next successive pair of tracks. The program solenoid 26 also controls the position of a program lamp switch 187 that sequentially energizes one of four program lamps 188, 190, 192 and 104 to indicate which pair of tracks, or program, is presently aligned with the transducers. A transport motor 196 controlled by a relay 198 having a form C contact including an armature 200, a normally closed contact 202 and a normally open contact 204. A second relay 206 having a form C contact comprising an armature 208, a normally closed contact 210 and a normally open contact 212, and a silicon controlled rectifier 214 complete the circuit for the motor 196 an the program solenoid 26, respectively. The operation of the relay 198 is controlled by a pair of transistors 216 and 218.

In operation, a telephone answering message is recorded on one track of each of the four two-track programs by placing the recorder in the record position and recording the answering message, which may be applied to the recorder via one of the inputs 114 and 116, onto one track of the first program. The head assembly 310 is then stepped to the next program, and a similar answering message is recorded at the beginning of one track of that program. The process is repeated until an answering message is recorded at the beginning of one track of each of the four programs. After all four answering messages have been recorded, the switch 14 is placed in the phone position and the head assembly 310 is stepped to the first program position by means of the program switch 180. The device is now ready to receive the first telephone call.

When the first telephone call is received, the automatic phone control module 16 senses the ringing voltage on the telephone line that appears across the terminals 78 and 80 and provides a voltage reduction, indicative of a ringing signal, at the output 220 thereof. The voltage reduction is coupled to the base of the transistor 218 via a capacitor 222 thereby resulting in a negative pulse being applied to the base of the transistor 218 for momentarily rendering the transistor 218 conductive. When the transistor 218 is rendered conductive, current from a voltage regulator (comprising a resistor 224, a Zener diode 226 and a filter capacitor 228 connected to the power supply 32) flows through the emitter to the collector of the transistor 218 and into the base to emitter junction of the transistor 216. The current flowing through the base to emitter junction of the transistor 216 renders the transistor 216 conductive thereby causing current to flow through the coil of the relay 198. This causes the armature 200 of the relay 198 to be brought into contact with the contact 204, thereby applying a positive potential from an output terminal 230 of the power supply 32 to the contact 204. The positive potential from the terminal 230 is coupled to the motor 196 through the pole 14k and results in current flow through the motor 196 from the terminal 230 through the contacting armature 200 and the contact 204, the pole 14k, the motor 196, and the contacts 208 and 210 to ground. This causes the motor 196 to transport the tape loop across the transducers and causes the recorded answering message to be picked up by the transducer 18, amplified by the amplifier 10 and applied to the telephone line. Simultaneously, the positive potential from the terminal 230 is applied to the base of the transistor 216, via the closed contacts 200 and 204 and a resistor 205, to maintain the transistor conductive to thereby latch the relay 198 in an energized condition. After the answering message has been completed, the received incoming message from the telephone line is applied to the amplifier 12 and recorded by the transducer 20 as previously described.

When the device is used in the telephone answering mode, the tape loop 322 in the tape cartridge 302 (FIGS. 14 and 15) has a playing time of approximately 1 minute or any length required to provide sufficient time to play back the recorded answering message and to record an incoming message of average length. As the tape loop makes one complete pass across the transducers, the conductive strip 328 disposed on the tape loop 302 is brought into contact with the contacts 184 and 186 to complete the current path between the controlled rectifier 214 and the program solenoid 26. Since the gate of the controlled rectifier 214 is connected to the terminal of the motor 196 that has the positive potential applied thereto, via a resistor 232, a forward biasing gate potential is applied to the controlled rectifier 214. Consequently, when the circuit between the contacts 184 and 186 is completed by the conductive tape 328, the controlled rectifier 214 is rendered conductive, thereby actuating the program solenoid 26. The reasons for utilizing the SCR 214 in series with the contacts are given in a subsequent portion of the specification.

When the program solenoid 26 is actuated, an armature 342 (FIGS. 2, 12 and 13) of the program lamp switch 187 is incremented one position between a first contact 234 and a second contact 236 by means of the indexing mechanism 312 which is driven by the motor 196 (FIGS. 4–6, 7, 9). As the armature 342 of the switch 187 traverses the distance between the contacts 234 and 236, it momentarily contacts a third contact 238. As the contact 238 is contacted, the base of the transistor 216 is grounded, thereby rendering the transistor 216 nonconductive and breaking the circuit applying current to the coil of the relay 198. This breaks the circuit between the armature 200 and the contact 204, thereby deenergizing the motor 196 and the solenoid 26. Also, deenergizing the relay 198 removes the positive potential from the gate of the controlled rectifier 214. The mechanism continues to coast until the contact 236 is grounded. This lights the program lamp 190 to indicate that the head assembly has been moved to the second program position. The device is now conditioned to receive the second telephone call.

Upon receipt of the second telephone call, the motor 196 is again energized, and since the head is now aligned with the second program tracks, the second answering message is applied to the telephone lines, and the second received incoming message is recorded. As the tape loop makes another pass, the conductive strip is again brought into contact with the contacts 184 and 186 to thereby again energize the program solenoid 26 to bring the armature 342 of the program lamp switch 187 into contact with a contact 240 to light the third program lamp 192. In traversing the distance between the contacts 236 and 240, a contact 242 is momentarily contacted to again deenergize the relay 198 to terminate the operation of the motor 196 after the second received telephone call has been recorded. The device is now conditioned to receive a third telephone message.

The operation of the device continues as previously described, with the armature 342 of the switch 187 gradually advancing past a contact 246 to a contact 244 to light the program lamp 194 and to condition the device to receive a fourth telephone message. After the fourth telephone message has been received, the armature 342 of the switch 187 is again advanced as previously described to bring it into contact with a contact 248. At this point, after the relay 198 is energized to receive the fourth telephone message, power is applied from the power supply terminal 230 through the armature 200, of the relay 98, the contact 204, the resistor 205, the contact 246, a diode 250 to a stop indicator lamp 252, and through the contacts 248 and the armature 342 of the switch 187 to ground to thereby render the transistor 216 nonconductive to permanently deenergize the relay 198. Simultaneously, a ground connection is provided to the coil of the relay 206 to thereby energize the relay 206 and break the contact between the armature 208 and the contacts 210 to open the circuit for the drive motor 196 and the program solenoid 26. Consequently, any further received telephone calls will not initiate the operation of the motor 196 nor the program solenoid 26. As a result, the device is prevented from answering any further calls and from recording any further messages on top of previously recorded messages. In addition, since the circuit between the contacts 204 and the armature 200 has been opened by the permanent deenergization of the relay 198, no positive potential will be applied to a terminal 254 (via a resistor 256) to the automatic phone control unit 16. This renders the automatic phone control module 16 inoperative to answer any more telephone calls, and avoids giving the caller the false impression that the phone has been answered.

After a completely recorded answering tape has been removed, or when the same cartridge is removed and reinserted, it is possible, because of insufficient inertia in the tape transport system, for the conductive tape to make contact with the program change sensing contacts 184 and 186 when the cartridge is inserted. This could result in unwanted program change when the answering device has its selector switch 14 positioned in either the record or play position, or in not receiving the next call on the next successive track when the switch 14 is positioned in the phone position.

Accordingly, the silicon controlled rectifier 214 has been provided in series with the program change sensing contacts 184 and 186 to delay any program change until the tape transport mechanism has moved the conductive strip well past the contacts 184 and 186. This is accomplished by supplying a positive gate potential to the gate of the controlled rectifier 214 through a delay network comprising the resistor 232 and a capacitor 266. The delay network prevents the silicon controlled rectifier 214 from being rendered conductive until after the motor 196 has been running sufficiently long to permit the capacitor 266 to be charged to a sufficiently high level to forward bias the gate to cathode junction of the controlled rectifier 214. This assures that any program change is made only after the motor 196 has been running long enough to assure that the sensing of the conductive tape indicates a valid program change, rather than the insertion of a cartridge. A resistor 264 is utilized to bias the controlled rectifier 214 in a nonconductive mode when no positive potential is applied to the resistor 232.

The solenoid and relay coils in the logic control unit 28 are bypassed by three diodes 258, 260 and 262 in order to limit the inductive voltage spikes generated by the respective coils when the circuit energizing that coil is opened. A resistor 268 biases the transistor 218 in a cutoff mode when no ringing signal is being detected, and a resistor 270 serves both as a collector load for the resistor 218 and a biasing resistor for the transistor 216.

In the circuit illustrated in FIGS. 1 and 2, the telephone answering device is rendered operative to play back the answering message and to record the incoming call upon the detection of the first ringing signal appearing on the telephone line that results in a reduction of the voltage at the terminal 220 of the automatic phone control module 16. However, in many instances, it is desirable to allow the telephone to ring more than once before initiating the operation of the answering device. This prevents spurious ringing signals from activating the answering device, and permits the user of the device to answer the phone if he so desires prior to the initiation of the automatic answering cycle.

The circuitry of FIGS. 1 and 2 is readily modified to provide such a feature. This is readily accomplished by simply replacing the transistor 218, capacitor 222 and resistor 268 of FIG. 2 with the circuit 400 illustrated in FIG. 16. The circuit 400 comprises a transistor 402 having an emitter load comprising a fixed resistor 404 and a variable resistor 406. A biasing resistor 408 maintains the transistor 402 normally in a cutoff state, and the base of the transistor 402 is coupled to the terminal 220 of the automatic phone control module 16 by a coupling capacitor 410. A programmable unijunction transistor (PUT) 412 has its cathode connected to the base of the transistor 216 and its anode connected to the collector of the transistor 402. A delay circuit comprising a resistor 414 and a capacitor 416, which integrates the ring indicative signal received from the terminal 220 via the capacitor 410 and the transistor 402, is also connected to the anode of the programmable unijunction transistor 412. A reference potential for the gate of the programmable unijunction transistor 412 is derived from a voltage divider network comprising a pair of resistors 418 and 420 that are connected to the output terminal 230 of the power supply 32. A regulated voltage for powering the circuit 41 is obtained by connecting the circuit 400 across the Zener diode 226.

Figure 16:
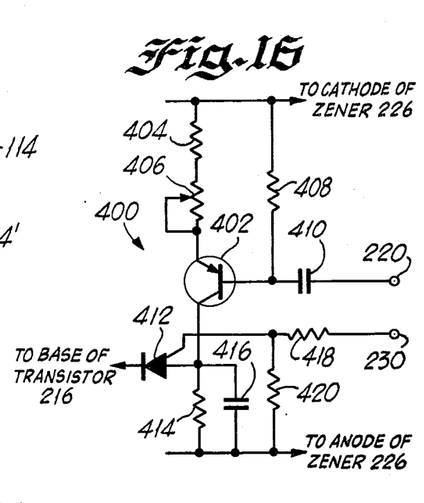
FIG. 16 is a schematic diagram of a modification to the circuit of FIGS. 1 and 2.

In operation, whenever a ringing signal, as evidenced by a drop in the voltage at the output terminal 220, is detected, the transistor 402 is rendered conductive for a period of time that is determined by the time constant of the capacitor 410, the resistor 408 and the input impedance of the transistor 402. Each time the transistor 402 is rendered conductive, current flows through the resistors 404 and 406 and through the emitter and collector terminals of the transistor 402 and into the parallel combination of the resistor 414 and capacitor 416. The amount of current flowing during the time that the transistor 402 is conductive is determined by the setting of the variable resistor 406. Consequently, each time a ringing signal is detected, a current pulse from the transistor 402 charges the capacitor 416 a predetermined amount, and the voltage applied to the anode of the programmable unijunction transistor 412 becomes more positive after each detected ringing signal until a number of rings sufficient to render the anode of the PUT 412 more positive than the gate have occurred. At this point, the PUT 412 is rendered conductive and discharges the capacitor 416 into the base of the transistor 216 and renders the transistor 216 conductive to initiate the answering cycle. The number of rings required to render the PUT 412 conductive may be altered by adjusting the variable resistor 406.

Figure 3:
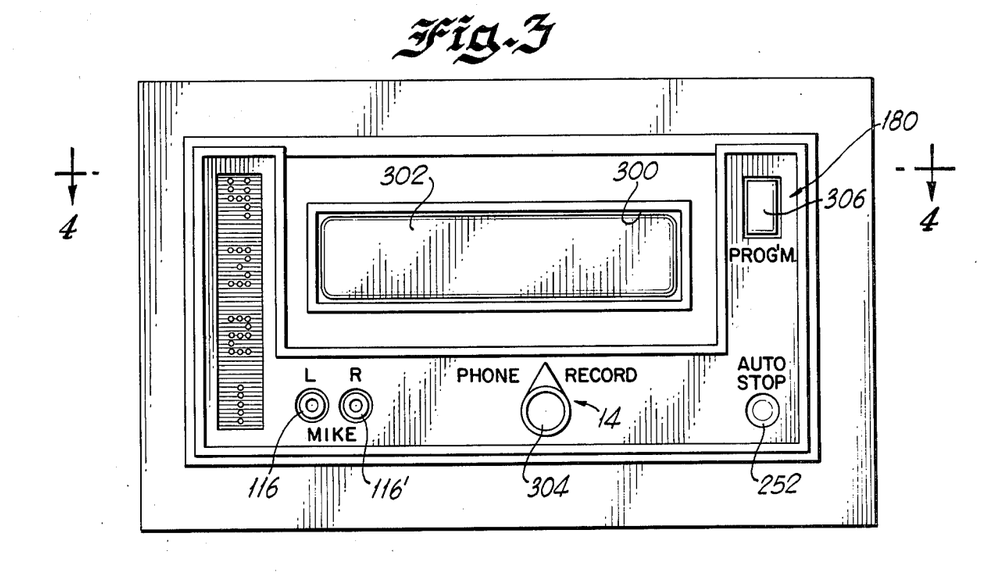
FIG. 3 is a front elevational view of the answering device according to the invention.
Figure 4:
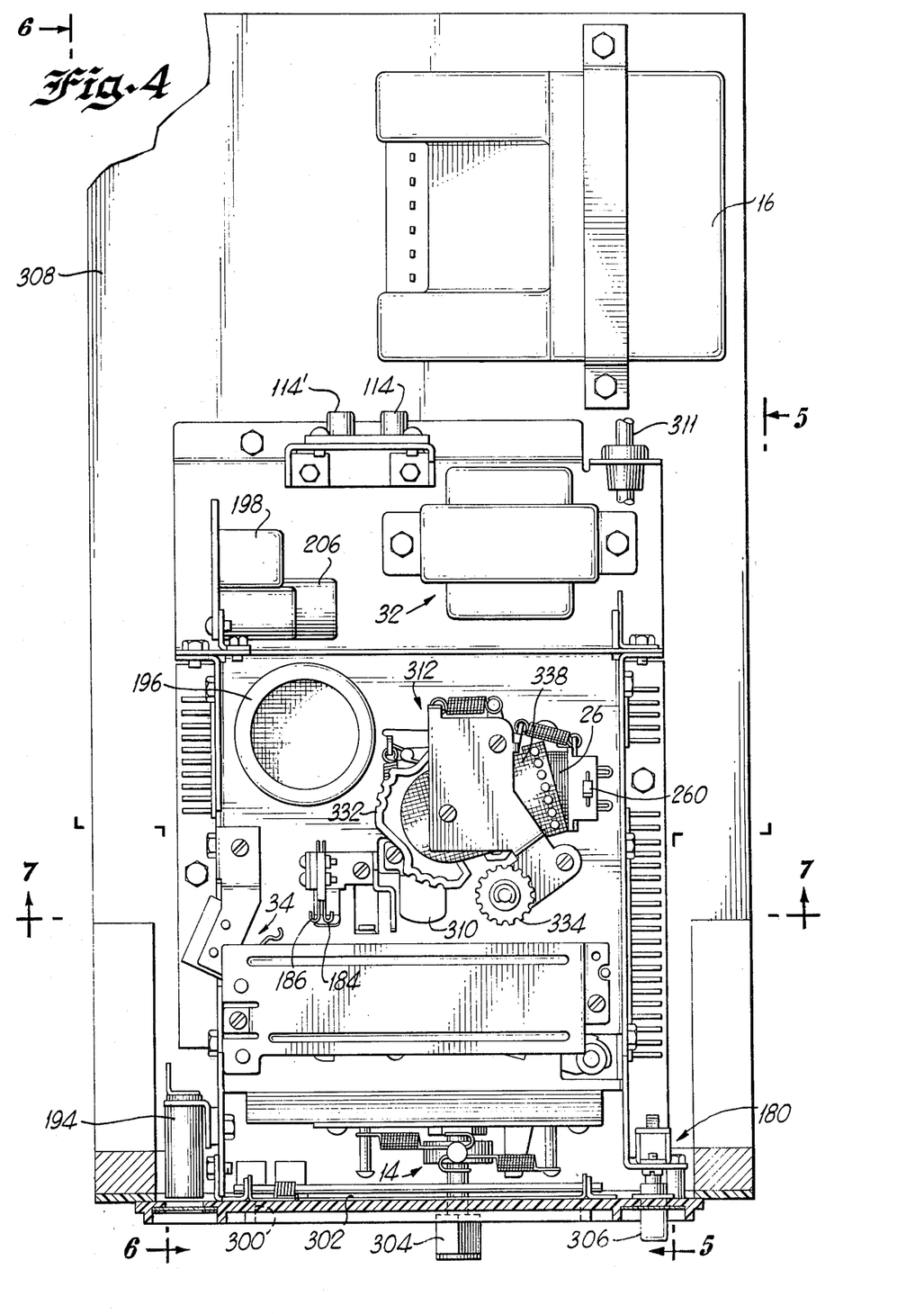
FIG. 4 is a top plan view of the answering device according to the invention taken along line 4—4 of FIG. 3.
Figure 5:
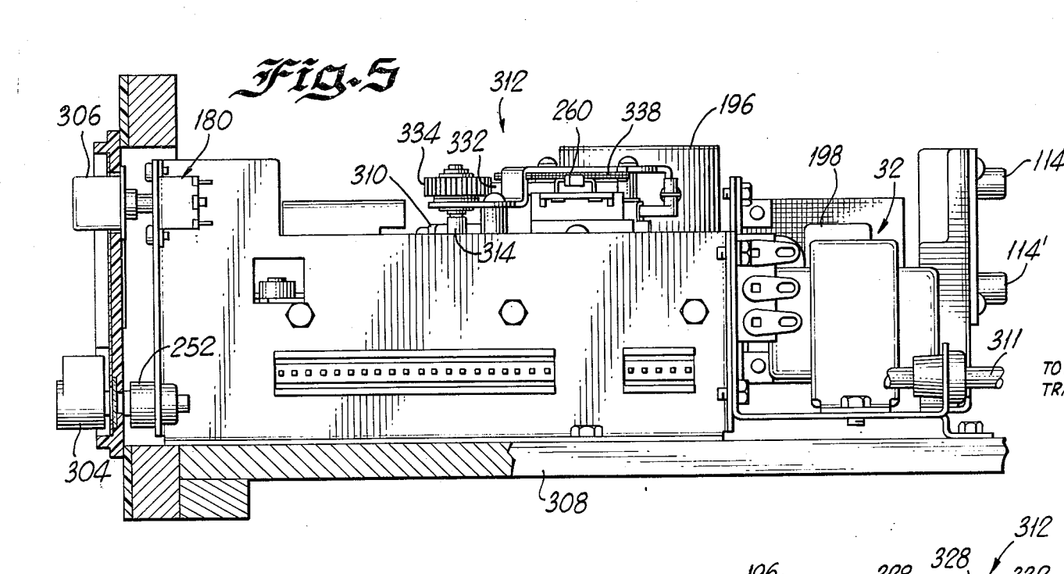
FIG. 5 is a side elevational view taken along line 5—5 of FIG. 4.
Figure 6:
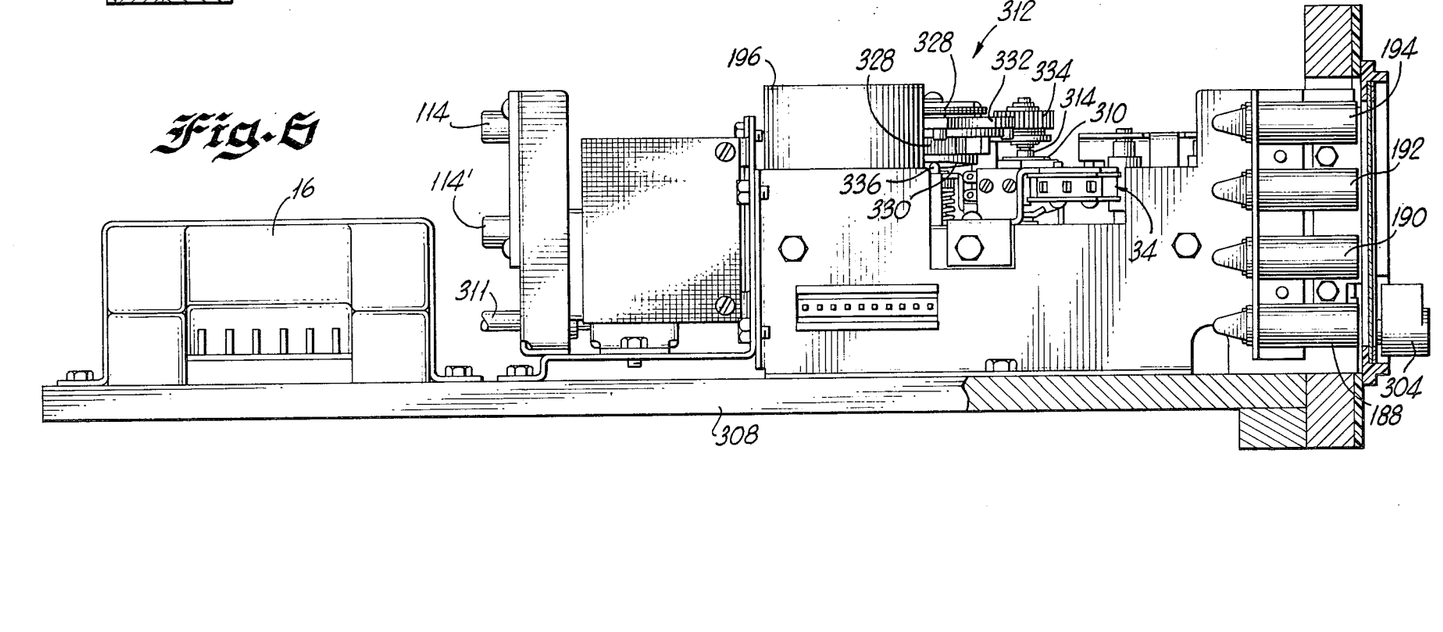
FIG. 6 is a side elevational view taken along line 6—6 of FIG. 4.
Figure 7:
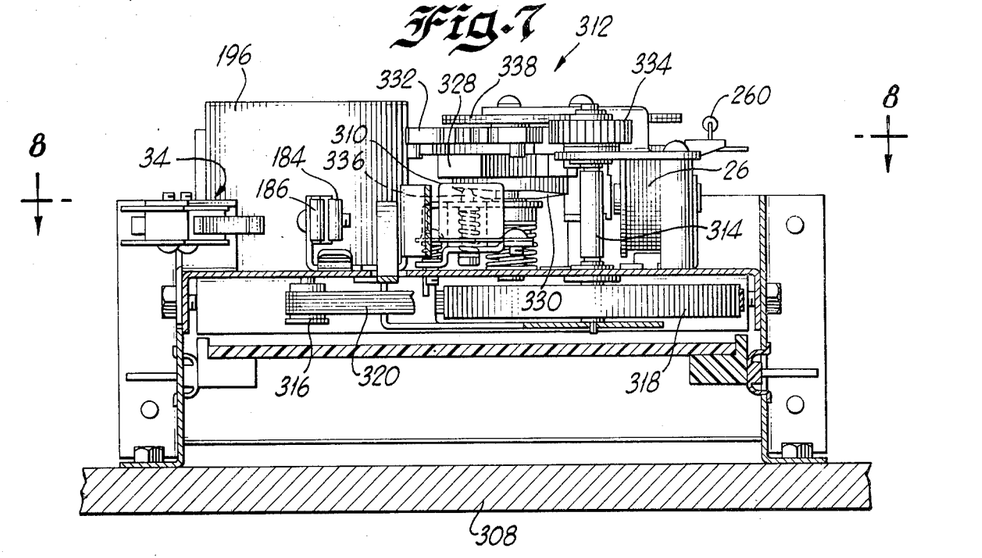
FIG. 7 is a front sectional view taken along line 7—7 of FIG. 4.
Figure 8:
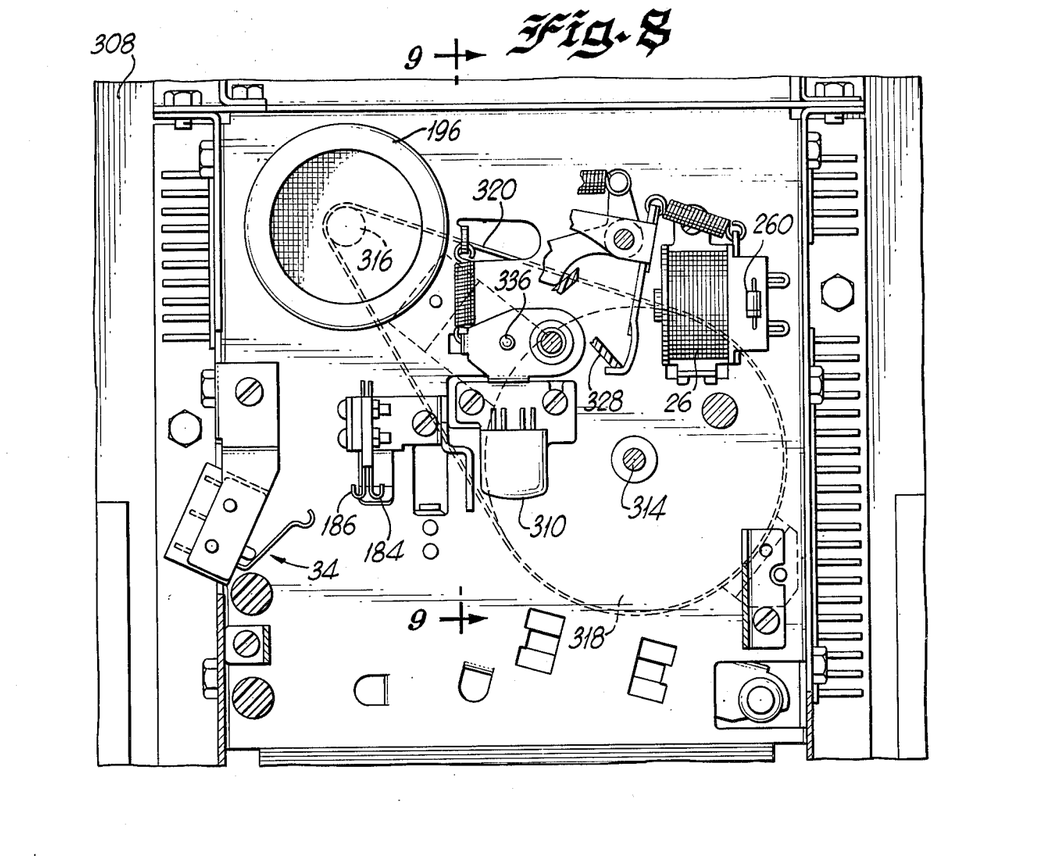
FIG. 8 is a top sectional view taken along line 8—8 of FIG. 7.
Figure 9:
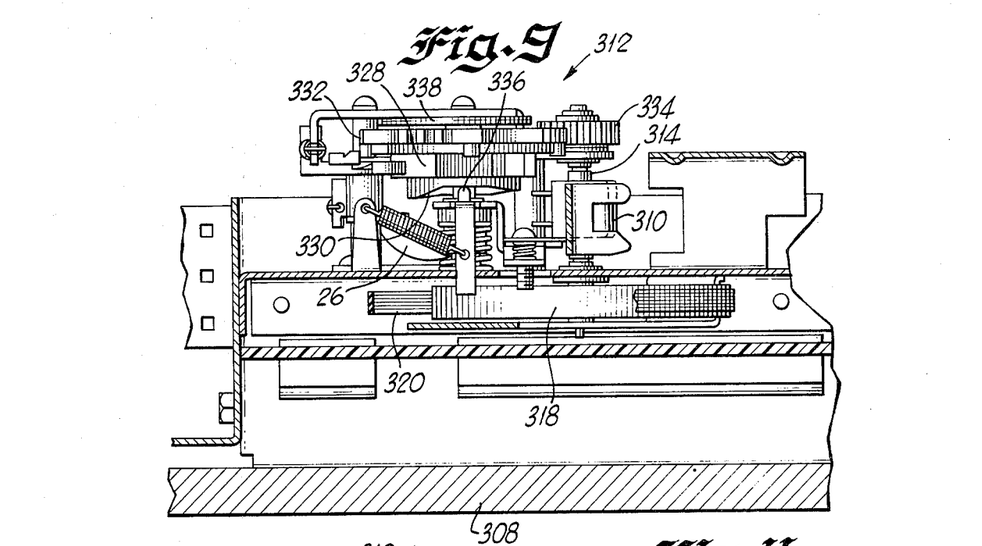
FIG. 9 is a side sectional view showing the head stepping assembly taken along line 9—9 of FIG. 8.
Figure 10:
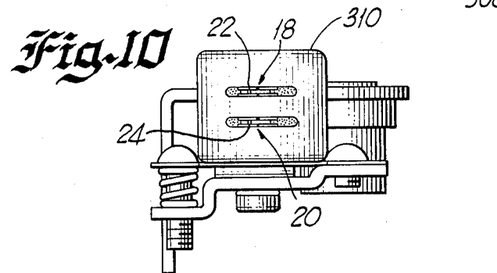
FIG. 10 is a detailed front view of the record/playback head assembly.
Figure 11:
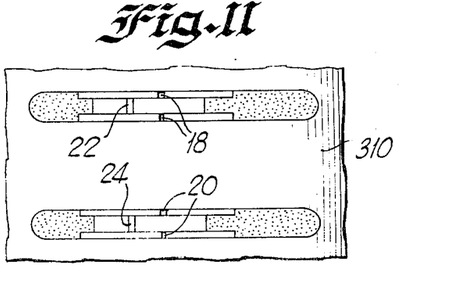
FIG. 11 is a detailed view of the record/playback and erase transducers of the head assembly illustrated in FIG. 10.

The mechanical details of the system according to the invention are shown in FIGS. 3–15. The device according to the invention contains an opening or tunnel 300 (FIG. 3) for receiving an eight-track tape cartridge 302. The selector switch 14 is controlled by a function selector knob 304 disposed on the front panel of the unit, and the program switch 180 is controlled by a push button 306. Four program indicating numbers 1–4, each illuminated by one of the indicator lamps 188, 190, 192 and 194, indicate the program number to which the transducer of the tape deck has been set. The auto stop indicator light 252 is also located on the front panel to inform the user that all four programs have been recorded, and the left and right microphone inputs 116 and 116′ are also located on the front panel to permit one or two microphones to be conveniently plugged into the unit.

The modified eight-track player/recorder and the automatic phone control module 16 are mounted to a common base plate (FIGS. 4–6) to facilitate the electrical interconnection between the tape player/recorder and the unit 16. Power for both the tape player and the unit 16 is obtained from a common line cord 311 that contains the leads 36 and 38 (FIG. 2).

Figures 12, 13, 14, 15:
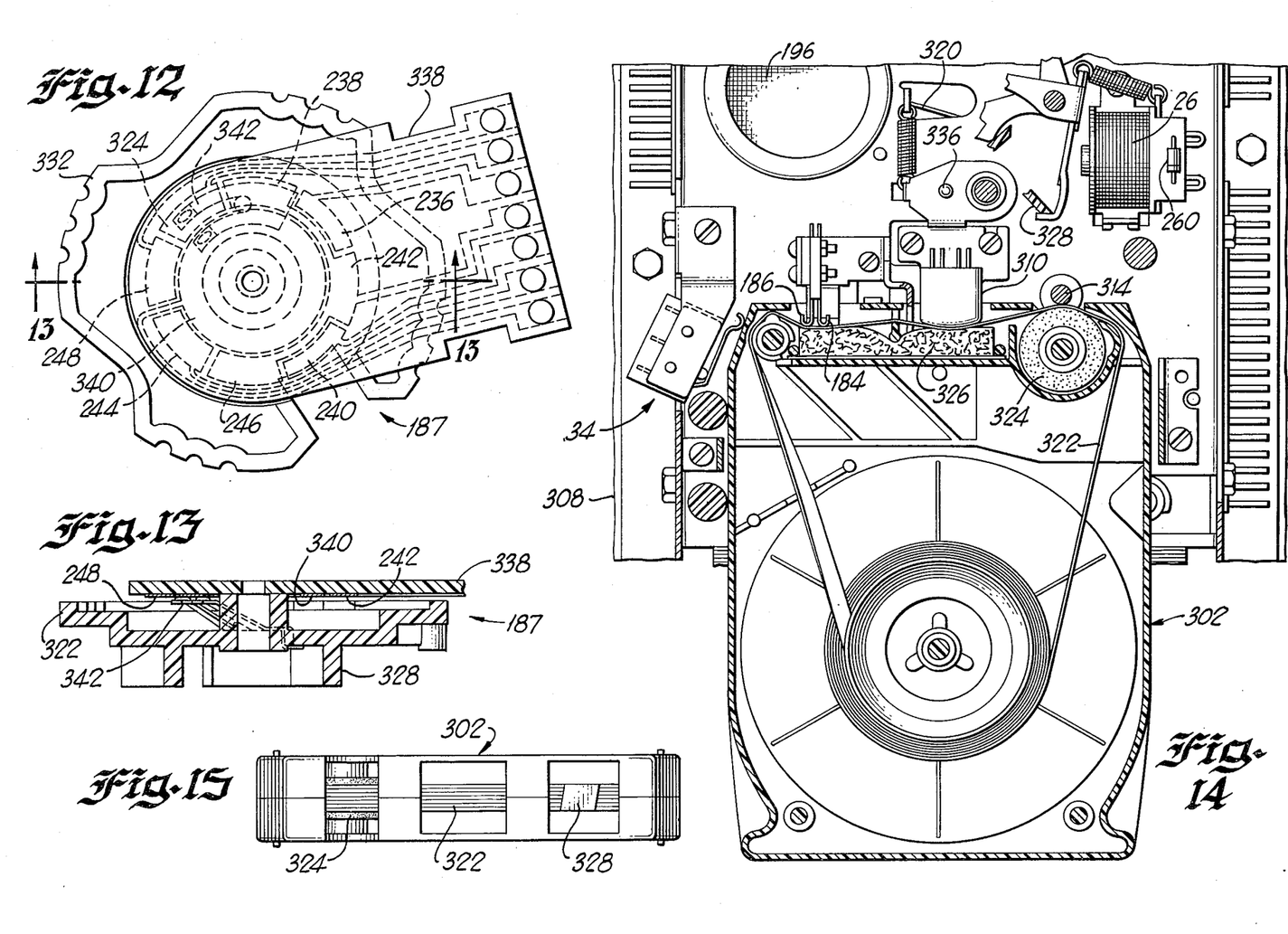
FIG. 12 is a top view of the transducer stepping mechanism and sequencing switch of the eight-track cartridge tape deck used with the answering device according to the invention.
FIG. 13 is a side sectional view of the stepping mechanism and sequencing switch taken along line 13—13 of FIG. 12.
FIG. 14 is a top sectional view of the answering device showing an eight-track tape cartridge loaded into the device.
FIG. 15 is a front view of a typical eight-track cartridge usable with the device according to the invention.

The tape deck contains a single record-play-erase head assembly 310. The head assembly 310 is vertically movable to four different positions by the program indexing mechanism 312 (FIGS. 4–8). The program indexing mechanism 312 is conventional, per se, however, the operation of the indexing mechanism 312 will briefly be described so that the operation of the telephone answering device according to the invention may be better understood. Upon insertion of the cartridge 302 into the tunnel 300 (FIG. 14) the switch 34 is closed, thereby energizing the motor 196. When energized, the motor 196 drives a capstan 314 via a pair of pulleys 316 and 318 and a drive belt 320. The capstan 314 engages the continuous tape loop 322 within the cartridge 302 and causes the tape 322 to be transported past the transducer 310 and the contacts 184 and 186 (FIG. 14). A roller 324 and a block of resilient material 326 within the cartridge 302 maintain the tape 322 in contact with the capstan 314, the transducer 310 and the contacts 184 and 186.

The capstan 314 continues to drive the tape 322 until the conductive strip 328 (FIG. 15) on the tape 322 bridges the contacts 184 and 186. This causes the program solenoid 26 to be energized, as described in the discussion of the electrical portion of the apparatus. The energization of the program solenoid 26 initiates the stepping action by partially rotating a head stepping cam 328 having a cam surface 330 and a wheel portion 332 so that the wheel portion 332 contacts a driving wheel 334 affixed to the capstan 314. Each time the wheel portion 332 is contacted by the driving wheel 334, the stepping cam 328 is rotated 90°. This rotation causes a cam follower 336 (FIGS. 7 and 9) to be moved to a different facet of the cam surface 330, and moves the head assembly 310 downwardly and into alignment with the second program on the tape 322. Upon completion of the 90° rotation of the stepping cam 328, the device is ready to answer the next received telephone call. As described in the discussion associated with FIGS. 1 and 2, the transducer 310 may also be indexed by momentarily closing the switch 180 which is controlled by the push button 306.

The armature 342 of the program lamp switch 187 is rotated by the stepping cam 328. In addition to the armature 342, the program lamp switch 187 comprises a printed circuit board 338 that has the contacts 234, 236, 238, 240, 242, 244, 246 and 248 plated thereon together with an annular ground contact 340. The armature 342 comprises a resilient contact member affixed to the stepping cam 328. The armature 342 provides an electrical contact between the ground contact 340 and one of the contact areas 234, 236, 238, 240, 242, 244, 246 and 248, depending on the position of the cam 328, and provides the automatic sequencing and automatic shut off feature previously described.

While certain preferred embodiments of the invention have been described by way of illustration, many modifications will occur to those skilled in the art; it will be understood, of course, that it is not desired that the invention be limited thereto, since modifications may be made, and it is, therefore, contemplated by the appended claims to cover any such modifications as fall within the true scope and spirit of the invention.

What is claimed as new and desired to be secured by Letters Patent of the United States is:

1. A telephone answering device comprising:
    first and second transducers movably affixed within said telephone answering device;
    means for transporting a single closed loop record medium having multiple pairs of recording tracks across each of said first and second transducers; and
    means electrically coupled to said first and second transducers for rendering said first transducer operative to play back signals recorded on one of the tracks of one of said pairs and for simultaneously rendering said second transducer operative to record signals on the other track of said one pair, wherein said device further includes means mechanically coupled to said first and second transducers for simultaneously realigning said transducers with different pairs of said tracks, said realigning means being operative to realign said transducers with a different pair of said tracks upon the recording of one telephone call.

2. A telephone answering device as recited in claim 1 further including means coupled to said first transducer for rendering said first transducer operative to record signals on one of said tracks for subsequent playback thereby.

3. A telephone answering device as recited in claim 1 wherein said realigning means includes means for inhibiting the further operation of said device after said transducers have been aligned once with each of said tracks.

4. A telephone answering device as recited in claim 1 further including means for receiving a tape cartridge containing an eight-track continuous loop recording tape, said continuous loop recording tape having an index mark disposed thereon.

5. A telephone answering device as recited in claim 4 wherein said realigning means is responsive to said indexing mark for realigning said transducers.

6. For use with a telephone system, a four message capacity telephone answering system comprising:
    an eight-track tape cartridge containing a closed loop of recording tape having eight recording tracks organized into four two-track programs and an index mark, each program containing one track for recording incoming telephone calls from said telephone system and one track for receiving an answering message, the length of said recording tape being selected to provide a playing time equal to the playing time of one answering message plus the expected length of one telephone call for each complete revolution of said tape loop;
    a two-channel tape deck having means for receiving said eight-track tape cartridge, a two-track tape head having first and second transducers, means for movably supporting said tape head in proximity with said recording tape, said supporting means including means for selectively aligning said first and second transducers with two of said recording tracks, said tape head having means for simultaneously rendering said first transducer operative to record signals onto a first track of the recording tape and for simultaneously rendering said second transducer operative to reproduce signals recorded on a second track of said recording tape and means responsive to the index mark for rendering said selective aligning means operative to realign said transducers with two other recording tracks upon completion of a complete revolution of said loop; and
    means for coupling said tape deck to said telephone system, said coupling means including means responsive to a ringing signal from said telephone system for rendering said tape deck operative to apply the reproduced recorded signals from said second track to said telephone system and simultaneously to record signals received from said telephone system onto said first track.

7. A device as recited in claim 7 wherein said tape cartridge has a playing time of approximately one minute per program.

8. A device as recited in claim 7 wherein said tape deck includes means for preventing the tape deck from recording more than four incoming telephone calls on a single cartridge.

9. A device as recited in claim 8 wherein said tape deck includes means for rendering said coupling means nonresponsive to ringing signals after four incoming phone calls have been recorded on a single cartridge.

10. For use with a telephone system, a telephone answering device comprising:
    a tape deck having two channels and means for simultaneously rendering one of said channels operative to record signals onto a first track of recording tape and for simultaneously rendering the other channel operative to reproduce signals recorded on a second track of said recording tape, said tape deck further including means for selectively rendering said tape deck operative in one of first, second and third conditions of operation, said deck being operative to record signals onto said first track and to play back signals recorded on said second track when operated in said first condition of operation, said tape deck being operative to record signals onto both first and second tracks when operated in said second condition of operation, and operative to play back signals recorded on both tracks when operated in said third condition of operation; and
    means for coupling said tape deck to said telephone system, said coupling means including means responsive to a ringing signal from said telephone signal for rendering said tape deck operative to apply reproduced recorded signals from said second track to said telephone system and simultaneously to record signals received from said telephone system onto said first track.

11. A system as recited in claim 10 wherein said tape deck includes first and second transducers for recording onto said first and second tracks, respectively, and means for applying a biasing signal to said first and second transducers, said biasing means including means for applying a direct current biasing signal to one of said transducers when said deck is operated in said first condition of operation, and for applying an alternating current biasing signal to said transducers when said tape deck is operated in said second condition of operation.

12. The method of automatically answering a telephone comprising the steps of:
- recording multiple answering messages on one half of the tracks of a multiple track record medium;
- playing back one of the answering messages into the telephone line upon receipt of an incoming telephone call;
- recording the incoming telephone call on another track of the same record medium associated with the played back answering message; and
- playing back a second one of the answering messages from a second track into the telephone line upon receipt of a subsequent telephone call.

13. The method recited in claim 12 wherein said recording medium is a tape cartridge, further including the steps of playing back one of said answering messages upon the receipt of each incoming telephone call, and recording each one of said telephone calls on a different track, each associated with one of the recording answering messages.

14. The method recited in claim 13 wherein said tape cartridge is an eight-track tape cartridge containing a tape loop having a one pass playing time sufficient to record the answering message and one incoming telephone call, wherein the step of playing back said answering messages includes the step of passing a pair of tracks of said record medium past a transducer assembly and automatically stepping the transducer assembly to another pair of tracks upon the completion of one pass of the tape loop.

15. The method recited in claim 14 further including the step of terminating the answering of further telephone calls after four calls have been recorded on the tape loop.

16. A telephone answering device for connection to a telephone line, said device comprising:
- means for receiving a tape cartridge having therein a continuous loop of multiple track recording tape having a predetermined length and an indexing mark located at a predetermined point on said loop;
- first and second transducers;
- means for transporting said recording tape across each of said first and second transducers;
- means mechanically coupled to said first and second transducers for selectively aligning each of said first and second transducers with one track of a predetermined pair of said recording tracks;
- means coupled to said aligning means for stepping said aligning means in a predetermined sequence thereby to simultaneously realign said first and second transducers with different pairs of said recording tracks;
- means coupled to said stepping means responsive to said indexing mark for rendering said stepping means operative to step said aligning means to realign said transducers with a different pair of tracks in response to the detection of said indexing mark;
- means coupled to said first transducer for reproducing signals recorded on one track of one of said pairs;
- means coupled to said second transducer for recording signals on the other track of said one pair;
- means coupling said recording means and said reproducing means to said telephone line for applying signals received from said telephone line to said recording means and for applying recorded signals from said reproducing means to said telephone line; and
- means coupled to said transporting means responsive to a signal indicative of a ringing signal on said telephone line for initiating the operation of said transporting means, said transporting means initiating means being responsive to said indexing mark responsive means for terminating the transporting of said recording tape in response to the detection of said indexing mark.

17. A telephone answering device as recited in claim 16 wherein said first and second transducers are mounted within a common head assembly, and said selective aligning means includes means for moving said head assembly in a direction transverse to the direction of travel of said tape loop.

18. A telephone answering device as recited in claim 17 further including means responsive to the position of said aligning means for rendering said device nonresponsive to said ringing signal when said aligning means is positioned in a predetermined position.

19. A telephone answering device as recited in claim 16 wherein said operation initiating means includes means responsive to a signal indicative of a plurality of consecutive ringing signals on said telephone line for initiating the operation of said transporting means.

20. A telephone answering device as recited in claim 19 wherein said initiating means includes integrating means and means responsive to said integrating means for initiating the operation of said transporting means only upon receipt of a signal from said integrating means indicative of the occurrence of a plurality of successive ringing signals on said telephone line.

21. A telephone answering device as recited in claim 20 wherein said integrating means includes a capacitor.

* * * * *